2,944,455

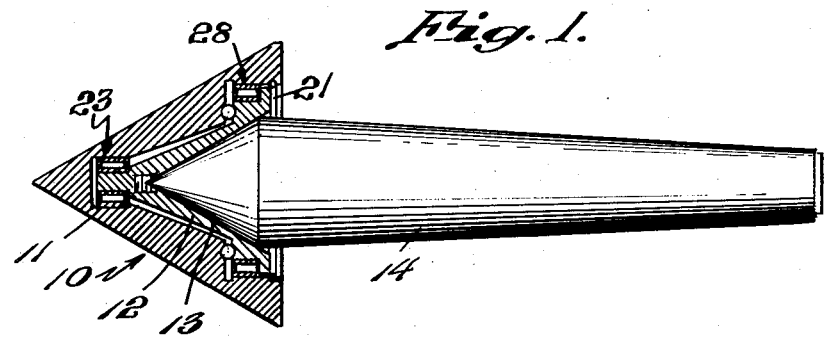
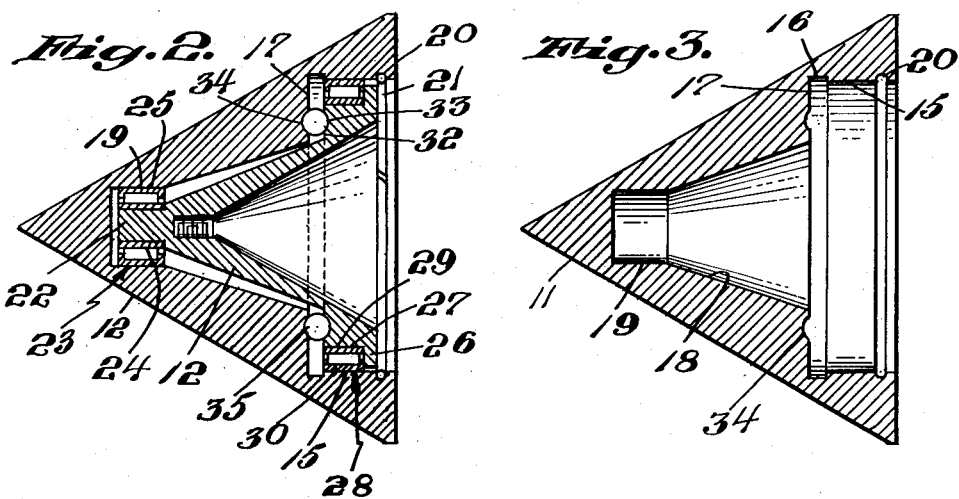
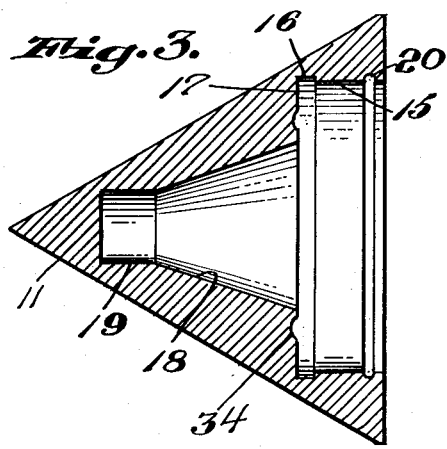
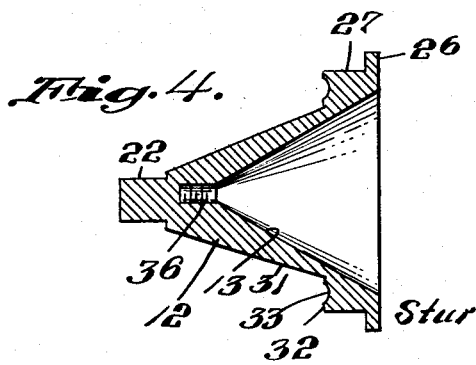
INVENTOR.
Sture Alfons Hultenius
Leo C. Hall
BY Barlow & Barlow
ATTORNEYS.

LATHE CENTER

Sture Alfons Hultenius, 29 Benbridge Ave., Lakewood, R.I., and Leo C. Hall, 87 Lane 2, Gaspee Point, Warwick, R.I.

Filed Apr. 23, 1957, Ser. No. 654,572

1 Claim. (Cl. 82—33)

This invention relates to a lathe or other machinery which uses a work supporting dead center.

Lathes, milling machines and other machinery usually each have a tail stock which carries a stationary center, usually referred to as a dead center, on which one end of the work piece is supported so as to be rotatable thereabout. The center is usually relatively soft and is advanced to the work by means of a hand wheel. Lubrication is required each time a new work piece is inserted. The pressure between the center and the work is guaged by the operator which often results in considerable friction causing overheating and scoring of the pointed end of the center, notwithstanding the usual lubrication applied thereto.

An object of the invention is to provide an adapter for a dead center which will operate in a manner to eliminate the undesirable condition above mentioned.

A more specific object of the invention is to provide an adapter for the dead center which will be rotatable with the work.

Another object of the invention is to provide an adapter for the dead center which will be self-aligning on the dead center.

Another object of the invention is to provide a unit which will contain such lubrication as is needed.

Another object of the invention is to provide a unit which will fit any center regardless of the taper or size of the shank that fits into the machine.

Another object of the invention is to provide a unit that can be mounted or dismounted in a matter of seconds on any machine that uses a center.

With these and other objects in view, the invention consists of certain novel features of construction as will be more fully described and particularly pointed out in the appended claim.

In the accompanying drawings:

Fig. 1 is a longitudinal view partially in section showing a lathe center with an adapter positioned thereon embodying the invention;

Fig. 2 is a longitudinal sectional view of the adapter shown in Fig. 1 on a larger scale;

Fig. 3 is a similar sectional view of the outer member of the adapter; and

Fig. 4 is a longitudinal sectional view of the inner member of the adapter.

Referring particularly to Fig. 1, the adapter indicated generally 10 is made of an outer conical member 11 which is rotatable about an inner generally conical member 12 which has a tapered recess 13 in which is received the pointed end of lathe dead center 14. The member 11 has a straight bore portion 15 (see Fig. 3), the inner portion 16 of which is made slightly larger and provides a wall 17 which extends at right angles or normal to the central axis of the member 11. A tapered bore 18 converges inwardly from the wall 17 and joins with a blind bore portion 19. An annular groove 20 is formed in the wall of bore 15 adjacent the outer end thereof and in which is received a split ring fastening 21 (see Fig. 2) to hold the inner member 12 within the outer member 11.

The inner member 12 (see Fig. 4) has a reduced cylindrical portion 22 which extends within bore 19 (see Fig. 2) and is spaced from its cylindrical walls. An anti-friction radial bearing 23 is located in such space which is herein shown as being of a roller or needle type having an outer and inner race 24 and 25 in which the rollers rotate. The race 24 is positioned in friction tight relation with portion 22, and the race 25 is frictionally received in the bore 19 whereby each race will be held stationary on the part engaged. Inner member 12 has an annular flange 26 and a cylindrical wall portion 27 which extends inwardly from said flange and is positioned opposite the bore 15 in spaced relation to the cylindrical walls thereof. An anti-friction radial bearing 28 which is located in such space is similar to bearing 23 but of a larger size. The inner race 29 of the bearing 28 is received in tight frictional engagement on wall 27 and abuts against flange 26. The outer race 30 of the bearing is received in the bore 15 in friction tight engagement with the wall thereof.

Referring to Fig. 4, it will be seen the cylindrical wall 27 is joined to the tapered wall portion 31 by a wall 32 which extends at right angles or normally to the central axis of member 12. This wall 32 is positioned parallel to but spaced from wall 17 (see Fig. 2) and opposite ball races 33, 34 are provided in these walls. Ball bearings 35 are positioned in these races so as to provide an anti-friction thrust bearing between members 11 and 12. It may be here mentioned that the ring fastening engages against the flange 26 to hold the members 11 and 12 in assembled relation.

The tapered recess 13 is complemental to the pointed end of center 14 and extends inwardly from the outer side of member 12 to intersect an axial screw threaded bore 36. The bore 36 serves two purposes, one to allow proper seating of the pointed end of the center 14 within the recess, the other to allow the attachment of a threaded member thereto (not shown) to withdraw the member 12 from member 11 should the occasion arise for such withdrawal.

It will be noted that the depth of recess 13 is approximately equal to the pointed end portion of center 14. This provides for a larger area of contact between the walls of the recess and the center 14. In advancing the center and adapter thereon into engagement with the work, only a sufficient force is required to properly seat the center into the recess and the pointed end of the member 11 into the center hole of the work piece. Since the area of the surface contact between the center 14 and the recess 13 is so very much greater than the area of surface contact between the bearings and races thereof, inner member 12 will be held stationary with the center under tension of the adapter on the work, and the outer member 11 will rotate with the rollers and balls of the bearings. The outer side of member 11 is on a taper similar to the taper of the pointed end of center 14.

From the above, it will be apparent that the adapter herein shown may be readily positioned on the pointed end of a lathe center and will be self-aligning therewith and in effect convert the said dead center into a rotating center. It will also be apparent that much less skill will be required in guaging the tension of the converted center on the work. It will be appreciated that the adapter may contain its necessary lubrication and revolves with the work piece making lubrication between the two unnecessary. Thus, the pointed end of the adapter may be maintained for a much longer period of time without becoming blunt and requiring reconditioning. It is also conceivable that the outer member 11 may be made interchangeable with like or different members 11.

We have referred to the device of the present invention as being an adapter. It should be understood, however, that the terms herein used have been employed merely to identify and distinguish more readily the different parts or elements of the structure.

We claim:

An adapter for use with a dead center of a lathe comprising inner and outer nested co-axial conical members, said inner member having a conical surfaced recess therein extending inwardly from its base face along the surface of a single cone adapted to receive and frictionally engage with the pointed end of a dead center, the outer surface of said inner member being conical and carrying antifriction bearings, one of said bearings being adjacent the base face of said member and the outer bearing being adjacent the point of said conical recess, said outer member having an outer conical surface and a conical recess therein, said inner member received in said conical recess of said outer member and rotatably mounting said outer member and means for securing said members against axial separation.

References Cited in the file of this patent

UNITED STATES PATENTS

| | | |
|---|---|---|
| 848,773 | Schultz | Apr. 2, 1907 |
| 1,751,711 | Ong | Mar. 25, 1930 |
| 1,821,331 | Svenson | Sept. 1, 1931 |
| 1,962,499 | Gairing | June 12, 1934 |
| 1,993,809 | Schnelle | Mar. 12, 1935 |
| 2,056,586 | Rohm | Oct. 6, 1936 |
| 2,362,812 | Fouchey | Nov. 14, 1944 |
| 2,499,131 | Coles | Feb. 28, 1950 |
| 2,701,978 | Lee | Feb. 15, 1955 |

FOREIGN PATENTS

| | | |
|---|---|---|
| 24,659 | Great Britain | 1905 |
| 81,154 | Switzerland | Dec. 12, 1918 |
| 876,350 | Germany | May 11, 1953 |
| 877,687 | Germany | May 26, 1953 |
| 906,513 | France | Jan. 9, 1946 |